United States Patent Office 3,845,017
Patented Oct. 29, 1974

3,845,017
POLYMERS STABILIZED WITH TERPENE ALCOHOLS AND AN ORGANOTIN COMPOUND
John Desmond Collins, Albrighton, Harold Coates, Wombourne, and Iftikhar Hussain Siddiqui, Birmingham, England, assignors to Albright & Wilson Limited, Oldbury, Warley, Worcs, England
No Drawing. Filed Nov. 30, 1973, Ser. No. 420,516
Claims priority, application Great Britain, Jan. 16, 1973, 2,274/73
Int. Cl. C08f 45/58
U.S. Cl. 260—45.75 K                 12 Claims

ABSTRACT OF THE DISCLOSURE

The stabilization of halogen containing resins by organotin mercapto carboxylate esters is enhanced by addition of terpenes containing primary or secondary allylic alcohol groups.

---

The present invention relates to compositions suitable for use in stabilising halogenated resin compositions such as homopolymers and copolymers of vinyl chloride or vinylidene chloride.

In United States Patent Specification No. 3,054,771 there is described the use of a mixture of one of a variety of organometallic compounds with terpenes of a particular class as a stabiliser system for halogenated resins. The class of terpenes described is a very broad one covering all those containing a double bond. It is, however, stated that an exo double bond is preferred.

We have now found that terpenes containing primary or secondary allylic alcohol groups enhance the stabilising properties of organotin mercapto-carboxylate esters to a surprising extent and that the degree of enhancement attained by these materials is greater for these terpenes than that attained by the compounds stated to be preferred in U.S. Pat. 3,054,771, such as β-caryophyllene, β-pinene and nopadiene. Moreover we believe that the enhancement effect which we attain is restricted to combinations of the particular terpenes with the organotin mercapto carboxylate esters; the enhancement is not found if these particular organotin compounds are replaced with other organotin carboxylates or carboxylate esters, for example dibutyltin dilaurate or dibutyltin bis(monomethyl maleate) or dibutyltin bis(monoisooctyl maleate).

The terpene alcohols also give a pleasant perfume to the halogenated resin. The use of these alcohols as co-stabilizers enables less of the expensive organotin stabilizers to be needed for equivalent stabilization of the resin.

The present invention provides a composition suitable for stabilizing halogen containing resins, said composition comprising a terpene alcohol having a primary or secondary allylic alcohol group, and an organotin mercapto carboxylate ester of formula

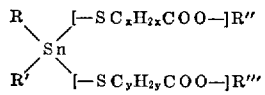

where the tin atom is bonded to the sulphur or oxygen atom of each mercapto carboxylate unit, and each of R and R', which may be different but are preferably the same represents an alkyl group of 1 to 10 carbon atoms, preferably alkyl of 4 to 8 carbon atoms e.g. butyl or octyl, a cyclohexyl group or a phenyl group, each of R" and R"', which are the same or different, represents an organic group containing C,H and optionally O and/or S atoms, preferably an alkyl group of 1–20 carbon atoms, a benzyl or cyclohexyl group or R" and R"' together represent an alkylene group of 1 to 10 carbon atoms e.g. 1,6 hexylene, and each of $x$ and $y$, which may be different but are preferably the same, represents an integer of 1 to 20 especially 1 or 2.

Suitable terpene alcohols include nerol and its geometrical isomers e.g. geraniol, patchenol, hydroxy-methyl longifolene, β-ionol, prenol, verbenol, 6-methyl hept-3-en-2-ol, pinocarveol and myrtenol. These are of course covered by the broad description in U.S. Pat. 3,054,771. However, with the exceptions of geraniol and pinocarveol no specific disclosure of these compounds is given there and we believe that the stabilising activity of the combination of organotin mercapto carboxylate esters and the terpene alcohols is superior to the combinations of organotin compounds and terpenes advocated in that specification.

Terpenes with 10–16 carbon atoms are preferred in particular nerol, geraniol, patchenol, β-ionol and hydroxymethyl-longifolene, nerol and geraniol are most important. One or more of the terpene alcohols can be used, so that crude terpene fractions may be employed as such, e.g. mixtures of geraniol and nerol.

Organotin mercapto carboxylate esters for use in the compositions of the invention are preferably of formula I

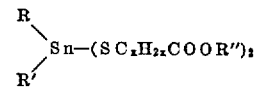

where R" is an alkyl group of 1–20 carbon atoms, preferably 6–20 carbon atoms and especially isooctyl, hexyl, 2-ethyl hexyl or lauryl, or a benzyl or cyclohexyl group or both R" together represent an alkylene group of 1 to 10 carbon atoms e.g. 1,6-hexylene and R and R' are as defined above and are preferably alkyl groups of 4–8 carbon atoms e.g. butyl and octyl. The preferred compounds are organotin thioglycollates and organotin mercaptopropionates (i.e. those in which $x$ is 1 or 2). Particular compounds which are of use include dibutyltin bis(isooctylthioglycollate), dioctyltin bis(isooctylthioglycollate), dibutyltin bis(isooctyl mercaptopropionate) dioctyltin bis(isooctyl mercaptopropionate) and similar compounds where the mercapto carboxylic acid group is esterified with a hexyl, cyclohexyl, 2-ethyl-hexyl, benzyl or lauryl group instead of the isooctyl group.

Other mercapto carboxylate esters for use in the compositions of the invention are of formula

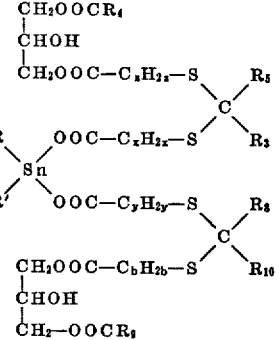

wherein each of $R_4$ and $R_9$, which are the same or different, is as defined above for R and R' or is an alkyl group 11–21 carbon atoms, an alkenyl group of 2–21 carbon atoms or an inertly substituted aromatic hydrocarbon group, wherein the substituent is preferably at least one group of formula —OH, —OR$_4$, —SR$_4$, —COOR$_4$, —OOCR$_4$ or —SSR$_4$, each of $R_3$, $R_5$, $R_8$ and $R_{10}$, which are the same or different, is as defined above for $R_4$ and $R_9$, or is hydrogen or at least one of the pairs $R_3$ and $R_5$, and $R_8$ and $R_{10}$ together with the carbon atom to which they are attached forms a cyclo alkane ring, preferably a cyclohexane ring and each of $x$, $y$, $z$ and $b$, which are the same or different is an integer of 1–6.

These compounds and their method of production are described in our copending Application Ser. No. 418,591, filed on Nov. 11, 1973.

Preferably the compounds are symmetric with $R_3$, $R_4$, $R_5$, $x$ and $z$ the same respectively as $R_8$, $R_9$, $R_{10}$, $y$ and $b$. $R_5$ and $R_{10}$ are preferably hydrogen or alkyl of 1 to 6 carbon atoms e.g. methyl groups. $R_4$ and $R_9$ are normally alkyl or alkenyl groups of 10 to 19 carbon atoms, preferably linear ones e.g. of formula $CH_3(CH_2)_z$, where $z$ is an integer of 9–18, preferably 10–16 and especially 17. $R_3$ and $R_8$ are preferably phenyl or substituted phenyl (the substituents being for example alkyl of 1 to 6 carbon atoms especially methyl, or alkoxy of 1 to 6 carbon atoms, especially methoxy or hydroxy) groups, branched chain alkyl group of 3–10 preferably 4–8 carbon atoms preferably those in which the free valency is at the point of branching i.e. of formula —CH $R_{11}R_{12}$, where $R_{11}$ and $R_{12}$ are alkyl groups of 1 to 6 carbon atoms especially ethyl and butyl e.g. pent-3-yl and hept-3-yl groups, or straight chain alkyl groups of 7 to 13 carbon atoms, e.g. n-nonyl and n-undecyl groups, $x$ and $y'$ are preferably 1 or 2, $z$ and $b$ are preferably 1 or 2. The groups $C_xH_{2x}$, $C_zH_{2z}$, $C_yH_{2y}$ and $C_bH_{2b}$ are preferably linear e.g. of formula $(CH_2)_x$.

In preferred compounds of formula II, the groups

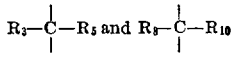

are the same and represent groups of formula

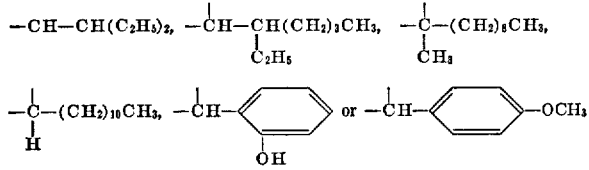

In the above formula II, $R_4$ and $R_9$ are preferably of formula $(CH_2)_cR_{13}$, $R_3$, $R_8$ and $R_{13}$ are each an alkyl group of 1 to 13 carbon atoms a cycloalkyl group, an aryl or aralkyl group, $R_5$ and $R_{10}$ are hydrogen, an alkyl or an aryl group and is an integer of 1 to 20. $R_{13}$ is most preferably a methyl group. The groups $C_xH_{2x}$, $C_yH_{2y}$, $C_zH_{2z}$ and $C_bH_{2b}$, are preferably $(CH_2)_x$, $(CH_2)_y$, $(CH_2)_z$ and $(CH_2)_b$.

The organotin compounds of formula II may be prepared by reacting at least one precursor of formula IV

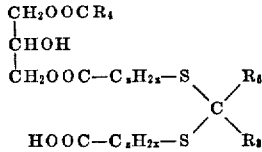

or formula V

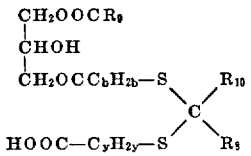

with a tin compound of formula RR′SnO, the ratio of the number of moles of tin compound to the total number of moles of precursors being 0.5:1 or less.

The precursors of formula IV can be prepared by reacting at least one mole of a mono ester of glycerol of formula $HOCH_2CHOHCH_2OCOR_4$ with one mole of a mercapto carboxylic acid of formula $HSC_zH_{2z}COOH$ to produce an intermediate of formula

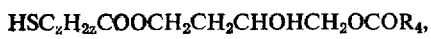

reacting this intermediate with a carbonyl compound of formula $R_3R_5CO$ and a mercapto carboxylic acid of formula $HSC_xH_{2x}COOH$ to produce the precursor of formula IV, the intermediate, carbonyl compound and latter mercapto carboxylic acid being used in about equimolar amounts. A corresponding sequence of reactions can be used to prepare the precursors of formula V.

Other diorganotin mercapto carboxylate esters, with an Sn—$S(CH_2)_2COOR''$ system, which may be used, have R″ derived from an alcohol which is pentaerythritol or trimethylol methane (or substituted derivatives thereof), all the hydroxyl groups of the alcohol apart from one (or in particular circumstances two) being blocked by carboxylic acid groups. Such esters and their mode of production are described in our copending British Patent application 21829/72.

Normally the organotin compound and the terpene will be present in the compositions of the invention in a ratio of from 20:1 to 1:1 preferably 10:1 to 2:1, e.g. about 10:1 to 5:1. Other materials may also be present in the composition if desired, for example additional stabilisers of the type hereinafter discussed may be included if desired.

From a second aspect the present invention provides a halogenated polymeric resin which comprises as a stabiliser therefor a mixture of an organotin mercapto carboxylate ester of formula I and a terpene containing a primary or secondary allylic alcohol group.

Normally the organotin mercapto carboxylate ester will be present in an amount of from 0.2 to 5% preferably 1 to 3% by weight based on the weight of the resin and the terpene is present in an amount of from 0.05 to 1% preferably about 0.2 to 0.5% by weight on the same basis.

The organotin mercapto carboxylate ester may be mixed with 1–50% by weight (based on the weight of the organotin mercapto ester) of a monoalkyltin compound such as a monoalkyltin tris (mercapto glycollate) ester of a $C_{1-20}$ alkanol e.g. monobutyltin tris (iso-octyl thioglycollate) or monooctyltin tris (isooctyl thioglycollate) to increase the stabilizing efficiency of mixture with the terpene. Preferably 5–25% based on total amount of organotin ester compound is used. Other additives which also improve the initial clarity of polymer during thermal tests with organotin compounds are (a) Butyl epoxy stearate (B.E. S.)
(b) Mono-octyltin tri (iso-octyl thioglycollate)
(c) Dibutyltin sulphide and oxide
(d) Dibutyltin cyclic mercapto acetate and/or Dioctyltin cyclic mercapto acetate and/or Dioctyltin cyclic β-mercapto propionate.

Optionally, but advantageously, compositions according to the invention also contain hindered phenols, having at least one alkyl substituent in a position ortho to the hydroxyl group as auxiliary stabilisers. Such phenols preferably have 1–8 carbon atoms in each alkyl group, which is preferably a tertiary butyl group. Examples of the phenols include butylated hydroxyanisole, 2,6-di-tert.-butylphenol, methylene bis-(2,4-di-tert.-butylphenol), methylene bis-(2,6-di-tert butylphenol), methylene bis-(2,6-di-tert-butyl-3-methylphenol), 4,4′-butylidene bis-(6-tert.-butyl-3-methylphenol), methylene bis - (4 - ethyl-6-tert.-butylphenol), methylene bis-(4-methyl-2,6-di-tert.-butylphenol). Particularly preferred, however, is 2,6-di-tert.-butyl-4-methylphenol. Such phenols may be present in an amount of up to 3%, preferably from 0.01 to 0.05% by weight of the resin and will normally be present at about 4–10% by weight, preferably 5–8% based on the total amount of organotin compounds used.

Esters of phosphorous and thiophosphorous acid may be employed in compositions according to the invention. Such compounds include halo-phosphites such as tris chloropropyl phosphite and polymeric phosphites such as hydrogenated 44′ isopropylidene diphenol phosphite resins produced by the condensation of triphenyl phosphite with hydrogenated 44' isopropylidene diphenol. Preferred phosphites and thiophosphites, however, are monomers having no substituents in the organo group and having no more than one sulphur atom. These include triaryl phosphites and trialkyl phosphites. Such compounds include, for example, triphenyl phosphite, trixylylphosphite, trinonyl phenyl phosphite and trioctyl phosphite. Diesters of phosphorous acid such as di-isodecyl phenyl phosphite are also of use. Particularly preferred are mixed alkyl aryl phosphites such as octyl diphenyl phosphite, isodecyl diphenyl phosphite and di iso-decyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabiliser composition is also useful if it is employed in a polymer composition containing an epoxy compound, as may be desired for example in cases where a delay of initial colour change is desired. Epoxy compounds which may be employed in such compositions include butyl epoxy stearate, esters of epoxidised oleic acid and compounds of the formula

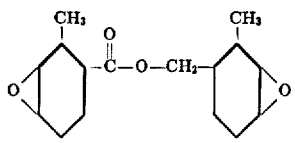

Organotin formulations as described above, optionally including a hindered phenol, an alkylaryl phosphite or aryl phosphite or an epoxide, will often be used as the only stabiliser in a polymeric vinyl chloride or vinylidene chloride composition. However, if desired conventional thermal stabilisers may also be included. These may include for example, metal soap stabilisers, such as cadmium, barium or zinc salts of fatty acids, or lead salts such as lead carbonate or stearate or dibasic lead phosphate or phthalate, or tribasic lead sulphate or conventional organotin stabilisers such as dibutyltin dilaurate or bibutyltin maleate or sulphur-containing compounds such as dialkyltin sulphides or alkylthiostannoic acids, with 1–10 carbon atoms in each alkyl group, e.g. dibutyltin sulphide or butyl thiostannoic acid.

In the practice of the invention the stabiliser formulation may be mixed with the copolymer resin in the conventional manner for example by milling with the resin on heated rolls at −100–160° C. e.g. about 150° C., although higher temperatures may be used when convenient, or by being mixed with particles of the polymer and then melting and extruding the mixture or by adding the stabiliser to a liquid resin.

Resins which may be used in compositions according to the invention normally contain at least 40% by weight of chlorine. Usually it will be a polymer or copolymer of vinyl chloride or vinylidene chloride but post-halogenated polyvinyl chloride or post-halogenated polyolefins, such as polyethylene, may be employed, if desired. Suitable monomers which may form such copolymers with vinyl chloride and vinylidene chloride include for example acrylonitrile, vinyl acetate, methyl methacrylate, diesters of fumaric acid and maleic acid, ethylene, propylene and lauryl vinyl ether and these co-monomers may be present in an amount of up to 25% of the total weight of monomers copolymerised.

The organotin stabiliser formulations may be employed to either plasticised resin compositions, for example those plasticised with carboxylic ester plasticisers e.g. di-2-ethyl hexyl phthalate, dibutyl sebacate or diisooctyl phthalate or with phosphate esters such as tri (alkylphenyl) phosphate, or may be employed in rigid compositions. Such rigid compositions contain little or no plasticiser although for some applications up to about 10% by weight of plasticiser may be present. This is in contrast with plasticised compositions where the amount of plasticiser present is normally greater than 50% by weight of the polymeric material and is often greater than 10% on that basis; amounts of 30–140% are often used.

In addition to the stabilisers, the compositions of the invention may also contain conventional additives e.g. pigments, fillers, dyes, ultraviolet absorbing agents and lubricants e.g. fatty alcohols such as cetyl or stearyl alcohol. The invention is illustrated in the following Examples:

PREPARATION OF ORGANOTIN ESTERS

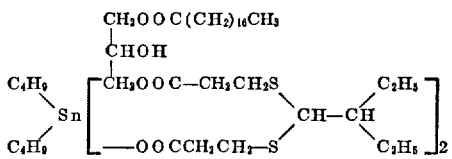

Glycerol mono stearate (34.8 g., 0.1M) and β-mercaptopropionic acid (10.6 g., 0.1M) were refluxed in toluene (250 ml.) in presence of p-toluene sulphonic acid (ca.0.2 g.–0.3 g.) till the calculated amount of water had collected

[to give $C_{17}H_{35}COOCH_2-CH(OH)-CH_2OOCCH_2CH_2SH$]

2-ethyl butyraldehyde (10.0 g., 0.1M) and mercaptopropionic acid (10.6 g., 0.1M) were also added into the above warm solution and the mixture refluxed until the calculated amount of water had collected again.

[to give $C_{17}H_{35}COOCH_2-$ $CH(OH)-CH_2OOCCH_2CH_2S-\overset{C_2H_5-CH-C_2H_5}{\underset{}{CH}}-SCH_2CH_2COOH$]

After cooling the solution dibutyltin oxide (12.5 g., ca. 0.05M) was added to the solution and the mixture refluxed until a clear solution was obtained. The hot solution was thus filtered under vacuum and finally the toluene was removed from the warm solution under reduced pressure.

The product is a white soft waxy solid at room temperature.

ANALYSIS

|  | Percent | |
| --- | --- | --- |
|  | Calculated | Found |
| Sn | 7.9 | 8.07 |
| S | 8.5 | 8.69 |

Its structure was also confirmed by I.R. & N.M.R.

Ester 2

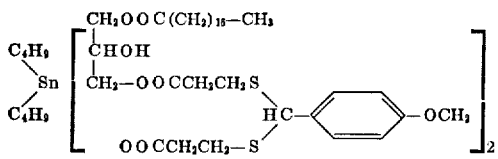

It was prepared by the same method as in Example 1 using the following quantities:

Step (1):
  (a) Glycerol mono stearate _____ g__ 34.8
  (b) β-Mercaptopropionic acid _____ g__ 10.6
  (c) p-Toluene sulphonic acid, ca. _____ g__ 0.3
  (d) Toluene _____ ml__ 300
Step (2):
  (e) Anisaldehyde _____ g__ 13.6
  (f) β-Mercaptopropionic acid _____ g__ 10.6
Step (3):
  (g) Dibutyltin oxide _____ g__ 12.5

The product is a slightly yellow, soft wax-like solid at room temperature.

ANALYSIS

| | Percent | |
|---|---|---|
| | Calculated | Found |
| Sn | 7.55 | 7.4 |
| S | 8.14 | 7.5 |

Its structure was also confirmed by I.R. and N.M.R. Esters 1 and 2 are described and claimed in our copending application (P508).

Testing of Mixtures of invention as stabilizers

Various terpenes were tested as co-stabilizers of a halogen containing resin in the presence of an organotin compound for initial colour development of the resin on heating against the same organotin compound without the terpene. Tables 1 to 13 illustrate the effects of terpenes in the stabilisation of polyvinyl chloride by Organotin Stabilisers, the Examples illustrating this invention and the Experiments being for comparison.

A series of rigid (non-plasticised) formulations were prepared having the following compositions:

| | Parts |
|---|---|
| (a) Polyvinyl chloride sold under the name Corvic D55/09 | 100 |
| (b) Cetyl/stearyl alcohol sold under the name Plastilube 30 | 0.5 |
| (c) Stabilizers | ᵃ1 or 2 |
| (d) Terpene | ᵃ0.1 to 2 |

ᵃ(As indicated in each of Tables 1–12.)

In the Tables stabilizer A is a mixture of dibutyltin bis (isooctylthioglycollate) and 10% monobutyltin tris (isooctylthioglycollate); stabilizer B is a mixture of stabilizer A and 15% butyl epoxystearate, stabilizer C is a mixture of dioctyl tin bis(isooctyl thio glycollate) and 4% monooctyltin tris (isooctylthio glycollate); stabilizer D is a mixture of stabilizer C and 15% butyl epoxy stearate; stabilizer E is a mixture of dioctyl tin bis (isooctyl thio glycollate) and 25% octyl tin tris (isooctyl thio glycollate).

TABLE 1
Effects of terpenes in the stabilisation of poly(vinyl chloride) by stabilizer A (1 part)

| Examples or Experiment No. | Terpene, name | Part | 0 | 5 | 7½ | 10 |
|---|---|---|---|---|---|---|
| Experiment 1 | Nil | Nil | 0 | 0 | 3 | 5 |
| Example 1 | Patchenol | 0.4 | 0 | 0 | 0 | 2–3 |
| Example 2 | β-Ionol | 0.4 | 0 | 0 | 1 | 3 |
| Example 3 | Longifolene | 0.2 | 0 | 0 | 1 | 3 |
| Example 4 | Nerol | 0.4 | 0 | 0 | 0 | 0–1 |
| Example 5 | Geraniol | 0.4 | 0 | 0 | 0 | 0–1 |
| Experiment 2 | Linalool | 0.4 | 0 | 0 | 3 | 5 |
| Experiment 3 | Terpineol | 0.4 | 0 | 0 | 3 | 5 |

NOTE.—Linalool contains an allylic tertiary alcohol group. Terpineol contains a non-allylic tertiary alcohol group.

TABLE 2
Effects of terpenes in the stabilisation of poly(vinyl chloride) by Stabiliser A (1 part)

| Example or Experiment No. | Terpene, name | Part | 0 | 5 | 7½ |
|---|---|---|---|---|---|
| Experiment 4 | Nil | Nil | 0 | 0 | 3 |
| Example 6 | Prenol | 0.4 | 0 | 0 | 1 |
| Example 7 | 6-methylhept-3-en-2-ol | 0.4 | 0 | 0 | 1+ |
| Example 8 | Pinocarveol | 0.5 | 0 | 0 | 1+ |
| Example 9 | Myrtenol | 0.4 | 0 | 0 | 1+ |
| Example 10 | Verbenol | 0.4 | 0 | 0 | 1 |
| Experiment 5 | Linanool | 0.4 | 0 | 0 | 3 |

TABLE 3
Effects of terpene in the stabilisation of poly(vinyl chloride) by Stabilizer A (1 part)

| Experiment or Example No. | Terpene, name | Parts | 0 | 5 | 7½ | 10 |
|---|---|---|---|---|---|---|
| Experiment 6 | Nil | Nil | 0 | 0 | 3 | 5 |
| Example 11 | Nerol | 0.4 | 0 | 0 | 0 | 0 |
| Experiment 7 | Linalool | 0.4 | 0 | 0 | 3 | 5+ |
| Experiment 8 | d-Limonene | 0.4 | 0 | 0 | 3 | 5 |
| Experiment 9 | Camphene | 0.4 | 0 | 0 | 3 | 5 |
| Experiment 10 | Nerolidol | 0.4 | 0 | 0 | 3 | 5+ |
| Experiment 11 | Citral | 0.4 | 0 | 0 | 3 | 5+ |
| Experiment 12 | Carvone | 0.4 | 0 | 0 | 3 | 5 |
| Experiment 13 | Caryophyllene | 0.4 | 0 | 0 | 3 | 5+ |
| Example 12 | Patchenol | 0.4 | 0 | 0 | 0 | 1–2 |
| Experiment 14 | Pinene | 0.2 | 0 | 0 | | 5 |
| Experiment 15 | do | 0.2 | 0 | 0 | | 5 |
| Experiment 16 | Myrcene | 0.2 | 0 | 0 | | 5 |

NOTE.—Experiments 7–16 show that for Stabilizer A containing organotin mercapto carboxylate ester, terpenes in general and many of those disclosed in U.S. Pat. 3,054,771 do not enhance the stabilization of the polyvinyl chloride.

TABLE 4
Effects of terpenes (0.66 part) in the stabilisation of poly(vinyl chloride) by Stabilizer B

| Experiment or Example No. | Terpene | 0 | 5 | 10 | 15 |
|---|---|---|---|---|---|
| Experiment 17 | Nil | 0 | 0 | 1 | 3–4 |
| Example 13 | Geraniol | 0 | 0 | 0 | 1–2 |
| Example 14 | Nerol | 0 | 0 | 0 | 1–2 |
| Experiment 18 | Linalool | 0 | 0 | 1 | 3–4 |
| Experiment 19 | Terpineol | 0 | 0 | 1 | 3–4 |
| Experiment 20 | Citronellol | 0 | 0 | 1 | 3–4 |

NOTE.—Citronellol has a non allylic primary OH group.

TABLE 5
Effects of nerol in the stabilisation of poly(vinyl chloride) by Stabilzer B (2 parts)

| Experiment or Example No. | Part of nerol | 0 | 5 | 10 | 15 |
|---|---|---|---|---|---|
| Experiment 21 | 0 | 0 | 0 | 1+ | 4 |
| Example 15 | 0.2 | 0 | 0 | 0–1 | 2 |
| Example 16 | 0.4 | 0 | 0 | 0–1 | 2 |
| Example 17 | 0.6 | 0 | 0 | 0–1 | 2 |
| Example 18 | 0.8 | 0 | 0 | 0–1 | 2 |
| Example 19 | 1.0 | 0 | 0 | 0–1 | 2 |

TABLE 6
Effects of geraniol in the stabilisation of poly(vinyl chloride) by Stabilizer B (2 parts)

| Experiment or Example No. | Parts of geraniol | 0 | 5 | 10 | 15 |
|---|---|---|---|---|---|
| Experiment 22 | Nil | 0 | 0 | 1+ | 4+ |
| Example 20 | 0.4 | 0 | 0 | 0–1 | 2 |
| Example 21 | 0.8 | 0 | 0 | 1 | 2– |
| Example 22 | 1.2 | 0 | 0 | 1 | 2 |
| Example 23 | 1.6 | 0 | 0 | 1 | 2– |
| Example 24 | 2.0 | 0 | 0 | 1 | 2+ |

TABLE 7
Effects of terpenes (0.2 part) in the stabilisation of poly(vinyl chloride) by Stabilizer D (1 part)

| Experiment or Example No. | Terpene | 0 | 5 | 10 | 15 |
|---|---|---|---|---|---|
| Experiment 23 | Nil | 0 | 0 | 3 | 7 |
| Example 25 | Nerol | 0 | 0 | 1 | 4 |
| Example 26 | Geraniol | 0 | 0 | 1 | 4–5 |

TABLE 8

Effects of terpenes (0.2 part) in the stabilisation of poly(vinyl chloride) by Stabilizer C (1 part)

| Experiment or Example No. | Terpene | Colour on Gardner scale after heating at 190° C. for given time (in min.) | | | |
|---|---|---|---|---|---|
| | | 0 | 5 | 10 | 15 |
| Experiment 24 | Nil | 0 | 0 | 2 | 6 |
| Example 27 | Nerol | 0 | 0 | 0–1 | 3–4 |
| Example 28 | Geraniol | 0 | 0 | 1 | 4– |

TABLE 9

Effects of terpenes (0.2 part) in the stabilisation of poly(vinyl chloride) by Stabilizer E (1 part)

| Experiment or Example No. | Terpenes | Colour on Gardner scale after heating at 190° C. for given time (in min.) | | | |
|---|---|---|---|---|---|
| | | 0 | 5 | 10 | 15 |
| Experiment 25 | Nil | 0 | 0 | 1 | 5 |
| Example 29 | Nerol | 0 | 0 | 0 | 2 |
| Example 30 | Geraniol | 0 | 0 | 0 | 2 |

TABLE 10

Effects of terpenes in the stabilisation of poly(vinyl chloride) by Stabilizer A (1 part)

| Experiment or Example No. | Terpene | Part | Colour on Gardner scale after heating at 190° C. for given time (in min.) | | | |
|---|---|---|---|---|---|---|
| | | | 0 | 5 | 10 | 15 |
| Experiment 26 | Nil | Nil | 0 | 0 | 5 | 6 |
| Example 31 | Nerol | 0.1 | 0 | 0 | 0–1 | 3+ |
| Example 32 | do | 0.2 | 0 | 0 | 0–1 | 3– |
| Example 33 | Geraniol | 0.1 | 0 | 0 | 0–1 | 3+ |
| Example 34 | do | 0.2 | 0 | 0 | 0–1 | 3– |

NOTE.—The results in Tables 5–10 show that nerol and geraniol are effective costabilisers of stabilisers A–E containing diorganotin mercapto ester.

TABLE 11

Effect of terpenes on the stabilisation of polyvinyl chloride by dibutyltin dilaurate (2 parts)

| Experiment No. | Terpene | Part | Colour on Gardner Scale after heating at 190° C. for given time in minutes | | | |
|---|---|---|---|---|---|---|
| | | | 0 | 5 | 10 | 15 |
| 27 | Nil | Nil | 4 | 5 | 11 | 13 |
| 28 | Nerol | 0.4 | 4 | 5 | 11 | 13 |
| 28 | Geraniol | 0.4 | 4 | 5 | 11 | 13 |
| 30 | Patchenol | 0.4 | 4 | 5 | 11 | 13 |
| 31 | β-Ionol | 0.4 | 4 | 5 | 11 | 13 |
| 32 | Hydroxymethyl longifolene | 0.4 | 4 | 5 | 11 | 13 |

NOTE.—The results in Table 11 show that terpenes within the scope of the invention do not costabilise sulphur free organotin esters.

TABLE 12

Effect of nerol in the stabilisation of polyvinyl chloride by dibutyltin bis(monomethyl maleate) (2 parts)

| Experiment No. | Part terpene | Colour on Gardner Scale after heating at 190° C. for given time in minutes | | | | |
|---|---|---|---|---|---|---|
| | | 0 | 5 | 10 | 15 | 20 |
| 33 | Nil | 0 | 0–1 | 1 | 2 | 3 |
| 34 | 0.1 | 0 | 0–1 | 1 | 2 | 3 |
| 35 | 0.2 | 0 | 0–1 | 1 | 2 | 3 |

NOTE.—Comparable results were also obtained with dibutyltin bis(isooctyl maleate) in place of the mono methyl maleate. These results show that nerol does not costabilise sulphur free organotin esters.

We claim:

1. A composition suitable for stabilizing halogen containing resins, said composition comprising a terpene alcohol having a primary or secondary allylic alcohol group, and an organotin mercapto carboxylate ester of formula $$\begin{array}{c} R \diagdown \quad \diagup [-SC_xH_{2x}COO-]R'' \\ Sn \\ R' \diagup \quad \diagdown [-SC_yH_{2y}COO-]R''' \end{array}$$

where the tin atom is bonded to the sulphur or oxygen atom of each mercapto carboxylate unit, and each of R and R', which are the same or different, represents an alkyl group of 1 to 10 carbon atoms, a cyclohexyl group or a phenyl group, each of R'' and R''', which are the same or different, represents an organic group containing C, H and optionally O and/or S atoms, and each of $x$ and $y$, which are the same or different represents an integer of 1 to 20, wherein the weight ratio organotin mercapto carboxylate ester to terpene alcohol is 20:1 to 1:1.

2. A composition according to claim 1 wherein the weight ratio of organotin mercapto carboxylate ester to terpene alcohol is 10:1 to 2:1.

3. A composition according to claim 1 wherein the terpene alcohol is at least one of geraniol, nerol, patchenol, hydroxymethyl-longifolene, β-ionol, prenol, verbenol 6-methyl hept-3-en-2-ol, pinocarveol and myrtenol.

4. A composition according to claim 1 wherein each of $x$ and $y$ is 1 or 2.

5. A composition according to claim 1 wherein each of R'' and R''' is an alkyl group of 1 to 20 carbon atoms, benzyl or cyclohexyl group, or R'' and R''' combined represent an alkylene group of 1 to 10 carbon atoms.

6. A composition according to claim 1 wherein the organotin mercapto carboxylate ester is of formula $$\begin{array}{c} CH_2OOCR_4 \\ | \\ CHOH \\ | \\ CH_2OOC-C_xH_{2x}-S \diagdown \quad R_5 \\ \quad \quad \quad \quad \quad \quad \quad \quad C \\ R \diagdown \quad OOC-C_xH_{2x}-S \diagup \quad R_3 \\ Sn \\ R' \diagup \quad OOC-C_yH_{2y}-S \diagdown \quad R_8 \\ \quad \quad \quad \quad \quad \quad \quad \quad C \\ CH_2OOC-C_bH_{2b}-S \diagup \quad R_{10} \\ | \\ CHOH \\ | \\ CH_2-OOCR_9 \end{array}$$

wherein each of $R_4$ and $R_9$, which are the same or different, is as defined for R and R' or is an alkyl group of 11–21 carbon atoms, an alkenyl group of 2–21 carbon atoms, or an inertly substituted aromatic hydrocarbon group, each of $R_3$, $R_5$, $R_8$ and $R_{10}$, which are the same or different, is as defined from $R_4$ and $R_9$, or is hydrogen or at least one of the pairs $R_3$ and $R_5$, and $R_8$ and $R_{10}$ together with the carbon atom to which they are attached forms a cyclo alkane ring, and each of $x$, $y$, $z$ and $b$, which are the same or different is an integer of 1–6.

TABLE 13

Esters 1 and 2 are self lubricating; when testing them no lubricant is added

| Example number or Experiment number | Stabilizers | Parts of stabilizer in 100 parts of PVC | Colour on Gardner scale after heating at 190° C. for given time in minutes | | |
|---|---|---|---|---|---|
| | | | 0 | 5 | 10 |
| Experiment 36 | (a) Ester 1 | (a) 1.5 part | 0 | 0 | 3+ |
| Experiment 37 | (b) DBT(IOT)+T (0.5) | (b) Tin equivalent to (a) | 2+ | 5+ | 8 |
| Example 35 | (c) Ester 1+Nerol (0.2) | (c) Tin equivalent to (a) | 0 | 0 | 2 |
| Experiment 38 | Ester 2 | 2.0 part | 1 | 3 | 4 |
| Experiment 39 | DBT(IOT)₂+T (0.5) | Tin equivalent to (a) | 0 | 3+ | 7 |
| Example 36 | Ester 2+Nerol (0.2) | do | 1 | 2 | 3 |
| Example 37 | Ester 2+Nerol (0.2)+zinc stearate (0.2) | do | 1 | 3 | 4+ |

NOTE.—DBT(IOT)₂ stands for dibutyltin bis(isooctyl thioglycollate); T(0.5) means that 0.5 parts Laurex CS lubricant (a mixture of cetyl and stearyl alcohols) was used.

7. A composition according to claim 6 where R and R' are both butyl or octyl.

8. A composition according to claim 7 wherein $R_3$, $R_4$, $R_5$, $x$ and $z$ are the same respectively as $R_8$, $R_9$, $R_{10}$, $y$ and $b$, $R_5$ and $R_{10}$ are hydrogen or alkyl of 1 to 6 carbon atoms, $R_4$ and $R_9$ are alkyl or alkenyl groups of 10 to 19 carbon atoms, $R_3$ and $R_8$ are phenyl or substituted phenyl groups, branched chain alkyl groups of 3–10 carbon atoms, or straight chain alkyl of 7–13 carbon atoms, $x$, $y$, $z$ and $b$ are 1 or 2.

9. A composition according to claim 8 wherein $R_4$ and $R_9$ are of formula $(CH_2)_c CH_3$, wherein $c$ is an integer of 10–16, $R_3$ and $R_8$ are phenyl, alkoxy- or alkyl-substituted phenyl with 1–6 carbon atoms in the alkyl or alkoxy group, branched chain alkyl of 4–8 carbon atoms of formula —$CHR_{11}R_{12}$ where $R_{11}$ and $R_{12}$ are alkyl groups of 1 to 6 carbon atoms or straight chain alkyl groups of 7–13 carbon atoms.

10. A composition according to claim 9 wherein the terpene alcohol is nerol.

11. A polymer composition which comprises a halogen-containing resin selected from the group consisting of a polyvinyl chloride, a polyvinylidene chloride and a chlorinated polyolefin and as a stabilizer therefor the composition as claimed in claim 1, comprising said terpene alcohol in an amount of 0.05 to 1% and said organotin mercapto carboxylate ester in an amount of 0.2 to 5%, the concentration being based on the weight of the resin.

12. A composition according to claim 11 which also comprises 1–50% based on the weight of the organotin ester of a monoalkyltin tris (mercapto glycollate ester of an alkanol of 1–20 carbon atoms).

References Cited

UNITED STATES PATENTS

| | | | |
|---|---|---|---|
| 3,054,771 | 9/1962 | Hiestand et al. | 260—45.7 |
| 2,836,628 | 5/1958 | Miller | 260—45.95 |
| 2,676,940 | 4/1964 | Kenyon | 260—45.95 |
| 3,222,317 | 12/1965 | Kauder | 260—45.75 |
| 3,196,129 | 7/1965 | Hechenkleikner | 260—45.75 |

V. P. HOKE, Primary Examiner

U.S. Cl. X.R.

252—395, 396; 260—45.95 P, 23 XA